United States Patent
Liu et al.

(10) Patent No.: US 12,167,379 B2
(45) Date of Patent: Dec. 10, 2024

(54) METHOD AND APPARATUS FOR INDICATING SLOT FORMAT INFORMATION

(71) Applicant: LENOVO (BEIJING) LIMITED, Beijing (CN)

(72) Inventors: Hongmei Liu, Beijing (CN); Lianhai Wu, Beijing (CN); Haipeng Lei, Beijing (CN); Haiming Wang, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 691 days.

(21) Appl. No.: 17/266,294

(22) PCT Filed: Aug. 10, 2018

(86) PCT No.: PCT/CN2018/099882
§ 371 (c)(1),
(2) Date: Feb. 5, 2021

(87) PCT Pub. No.: WO2020/029229
PCT Pub. Date: Feb. 13, 2020

(65) Prior Publication Data
US 2021/0314942 A1 Oct. 7, 2021

(51) Int. Cl.
*H04W 72/0446* (2023.01)
*H04W 72/23* (2023.01)

(52) U.S. Cl.
CPC ....... *H04W 72/0446* (2013.01); *H04W 72/23* (2023.01)

(58) Field of Classification Search
CPC .................... H04W 72/0446; H04W 72/23
See application file for complete search history.

(56) References Cited

U.S. PATENT DOCUMENTS

| | | | |
|---|---|---|---|
| 2017/0325225 A1 | 11/2017 | Dinan | |
| 2018/0206267 A1 | 7/2018 | Islam et al. | |
| 2018/0227922 A1 | 8/2018 | Lee et al. | |
| 2021/0160861 A1* | 5/2021 | You | H04W 56/0005 |
| 2022/0070809 A1* | 3/2022 | Song | H04W 72/0446 |

FOREIGN PATENT DOCUMENTS

| | | |
|---|---|---|
| CN | 108076525 A | 5/2018 |
| CN | 108307509 A | 7/2018 |
| EP | 2706798 A1 | 3/2014 |
| WO | 2017132811 A1 | 8/2017 |

OTHER PUBLICATIONS

International Searching Authority, "Notification of Transmittal of the International Search Report and the Written Opinion of the International Searching Authority, or the Declaration", PCT/IB2018/099882 Aug. 10, 2018, pp. 1-7.

* cited by examiner

*Primary Examiner* — Peter P Chau
(74) *Attorney, Agent, or Firm* — Kunzler Bean & Adamson

(57) ABSTRACT

A method and apparatus for indicating slot format information is disclosed. The method comprising: t receiving a RRC (radio resource control) signaling indicating a time domain starting position of a slot format information and determining the time domain starting position based on the RRC signaling.

10 Claims, 6 Drawing Sheets

METHOD AND APPARATUS FOR INDICATING SLOT FORMAT INFORMATION

FIELD

The subject matter disclosed herein relates generally to wireless communications, and more particularly relates to a method and apparatus for indicating slot format information.

BACKGROUND

The following abbreviations are herewith defined, at least some of which are referred to within the following description: Third Generation Partnership Project ("3GPP"), New Radio ("NR"), Integrated Access and Backhaul ("IAB"), Time-Division Multiplexing ("TDM"), Downlink Control Information ("DCI"), Uplink (UL), Downlink (DL), Radio Resource Control ("RRC"), Radio Network Temporary Identifier ("RNTI"), User Entity/Equipment (Mobile Terminal) (UE).

In 3GPP 5G NR, multi-hop IAB can provide better coverage and can be viewed as an effective way to lower wired backhaul deployment cost and load for operators. Due to a half-duplex constraint. TDM-based resource multiplexing between backhaul and access links will be an important research topic in a multi-hop IAB system.

Dynamic resource partitioning between backhaul and access links can be achieved by a slot format indication in DCI 2_0. In NR R15, there are 3 possible states (D/F/U) for each symbol in existing slot format definition, where a symbol indicated as "D" is used for downlink transmission, a symbol indicated as "U" is used for uplink transmission, and a symbol indicated as "F" means the symbol can be used for DL or UL based on dynamic scheduling (UL grant or DL grant). In NR R16, a straightforward solution is to reuse the legacy slot format indication for an IAB system, but it will lose flexibility and cause resource collision between access and backhaul links.

To avoid the above problem, a new state needs to be defined.

Additionally, in a legacy specification, when a DCI 2_0 is received in a slot, the indicated slot format takes effect in the same slot and starts/ends at the slot boundary. However, in a multi-hop IAB scenario, if the starting position of DCI 2_0 is still limited to the slot boundary, some symbols cannot be indicated by DCI 2_0, which will impact the resource utilization efficiency of multiplexing between backhaul and access links.

In this sense, the enhancement to legacy mechanisms is necessary in order to indicate DCI 2_0 effective duration.

REFERENCES

[1] R1-1806024, ZTE
[2] R1-1806649, LG
[3] R1-1806660, Nokia
[4] R1-1806089, VIVO
[5] R1-1806859, OPPO
[6] R1-1807393, Qualcomm
[1] R1-1806024, ZTE

BRIEF SUMMARY

A method and apparatus for indicating slot format information is disclosed.

In one embodiment, a method for determining slot format information is provided, the method comprising: receiving RRC (radio resource control) signaling indicating a time domain starting position of a slot format information; and determining the time domain starting position based on the RRC signaling.

In one embodiment, determining the time domain starting position further comprising: determining the time domain starting position based on the RRC signaling indicating whether the time domain starting position is the symbol when a DCI (downlink control information) is detected or symbol 0 of the slot when the DCI is detected.

In one embodiment, the determining the time domain starting position comprising: determining the time domain starting position based on the RRC signaling indicating the time domain offset between the symbol when the DCI is detected and the time domain starting position.

In one embodiment, determining the time domain starting position further comprising: determining the time domain starting position based on the RRC signaling indicating the number of symbols between the DCI of two nodes.

In one embodiment, a method for indicating slot format information is provided, the method comprising: receiving information indicating time domain resource used for one of backhaul downlink, backhaul uplink, flexible backhaul, and access link; and determining the time domain resource formats.

In one embodiment, the slot format information is indicated per symbol.

In one embodiment, the slot format information is indicated per symbol group.

In one embodiment, the symbol group size is indicated by the RNTI of the DCI (downlink control information).

In one embodiment, the symbol group size is indicated by the starting position of the payload of a cell in the DCI (downlink control information).

In one embodiment, the symbol group size is indicated by the symbol when the DCI (downlink control information) is detected.

In one embodiment, further comprising reserved rows in an existing table can be used for each group size, and different rows are associated with different group sizes.

In one embodiment, a node for determining slot format information is provided, the apparatus comprising: a transceiver; a processor is configured to control the transceiver to: receiving a RRC signaling indicating a time domain starting position of a slot format information; and determining the time domain starting position based on the RRC signaling.

In one embodiment, a node for indicating slot format information is provided, the apparatus comprising: a transceiver; a processor is configured to control the transceiver to: receiving information indicating time domain resource is used for one of backhaul downlink, backhaul uplink, flexible backhaul, and access link; and determining the time domain resource formats.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
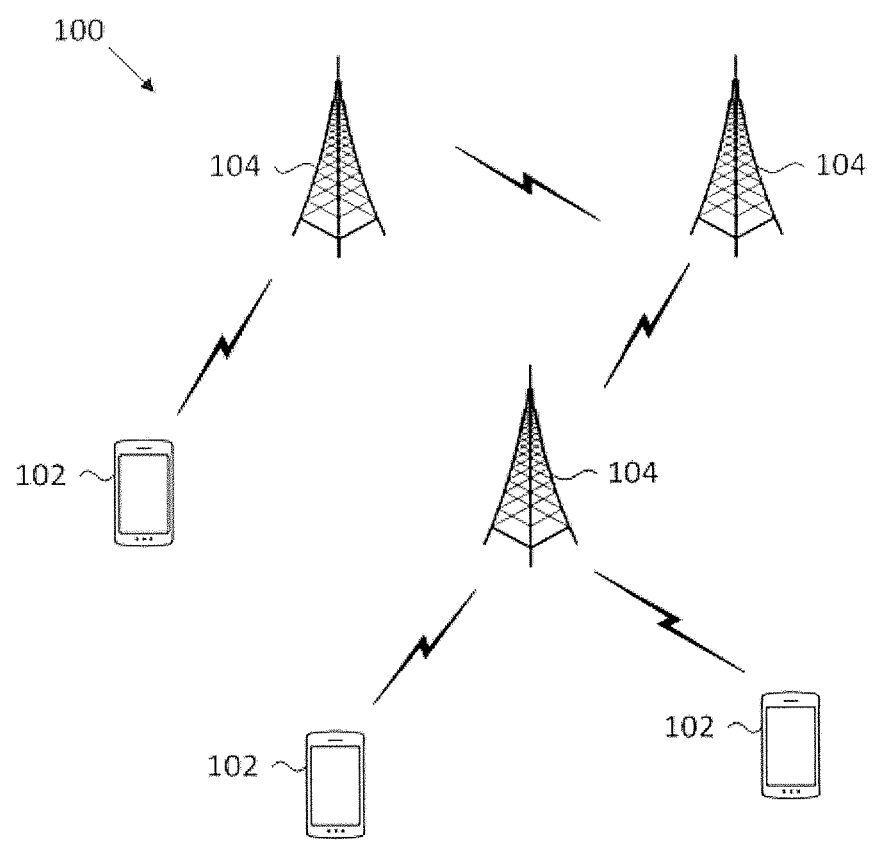
FIG. 1 is a schematic diagram illustrating one embodiment of the multi-hop IAB system.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including." "comprising." "having." and variations thereof mean "including but not limited to," unless expressly specified otherwise. An enumerated listing of items does not imply that any or all of the items are mutually exclusive, unless expressly specified otherwise. The terms "a." "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of the multi-hop IAB system 100. In one embodiment, the multi-hop IAB system 100 includes nodes 104 and remote nodes 102. Even though a specific number of nodes 104 and remote nodes 102 are depicted in FIG. 1, one skilled in the art will recognize that any number of nodes 104 and remote nodes 102 may be included in the multi-hop IAB system 100.

In one embodiment, the remote nodes 102 may include computing devices, such as: desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), etc. . . . In some embodiments, the remote nodes 102 include wearable devices, such as: smart watches, fitness bands, optical head-mounted displays, etc. . . . The remote nodes 102 may be referred to as: "subscriber nodes", "mobiles", "mobile stations", "users", "terminals", "mobile terminals", "fixed terminals", "subscriber stations", "UE", "user terminals". "a device", or by other terminology used in the field. The remote nodes 102 may communicate directly with one or more of the nodes 104 via DL and UL communication signals.

The nodes 104 may be distributed over a geographic region. In certain embodiments, a node 104 may also be referred to as: "access point", "access terminal", "base", "base station", "Node-B", "eNB", "gNB", "Home Node-B", "relay node", "device", or by any other terminology used in the field. The nodes 104 are generally part of a radio access network that includes one or more controllers communicably coupled to one or more corresponding nodes 104. The radio access network is generally communicably coupled to one or more core networks, which may be coupled to other networks, like the Internet and public-switched telephone networks, among other networks. These and other elements of radio access and core networks are not illustrated but are generally well known by those having ordinary skill in the field.

In one implementation, the multi-hop IAB system 100 is compliant with the 3GPP 5G NR. More generally, however, the multi-hop IAB system 100 may implement other open or proprietary communication protocols, for example, WiMAX, among other protocols.

The nodes 104 may serve a number of remote nodes 102 within a serving area, for example, a cell or a cell sector via a wireless communication link. The nodes 104 transmit DL communication signals to serve the remote nodes 102 in the time, frequency, and/or spatial domain.

Figure 2:
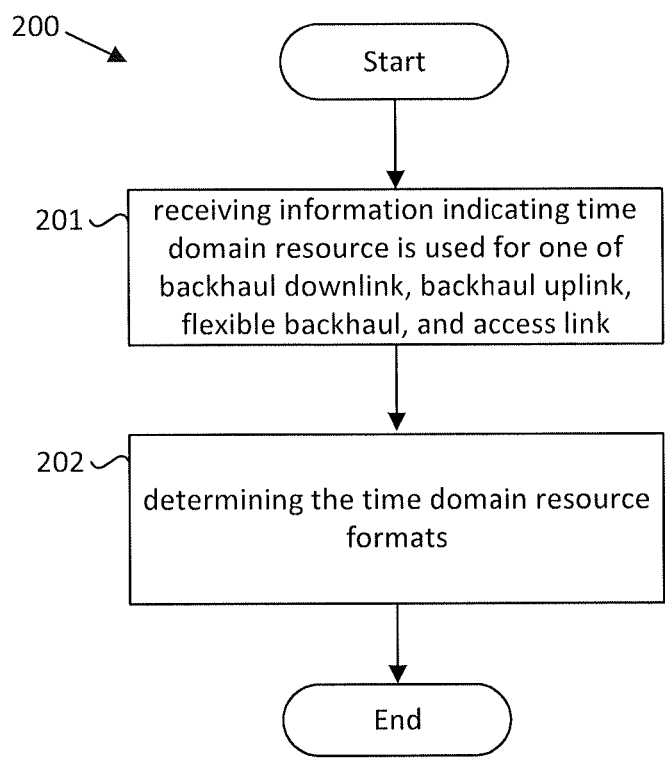
FIG. 2 is a schematic flow chart diagram illustrating a method for indicating slot format information.

FIG. 2 is a schematic flow chart diagram illustrating a method for determining slot format information. The method includes steps 201-202:

Step 201: receiving information indicating the time domain resource used for one of the backhaul downlink, backhaul uplink, flexible backhaul, and access link;

Step 202: determining the time domain resource formats.

Figure 3:
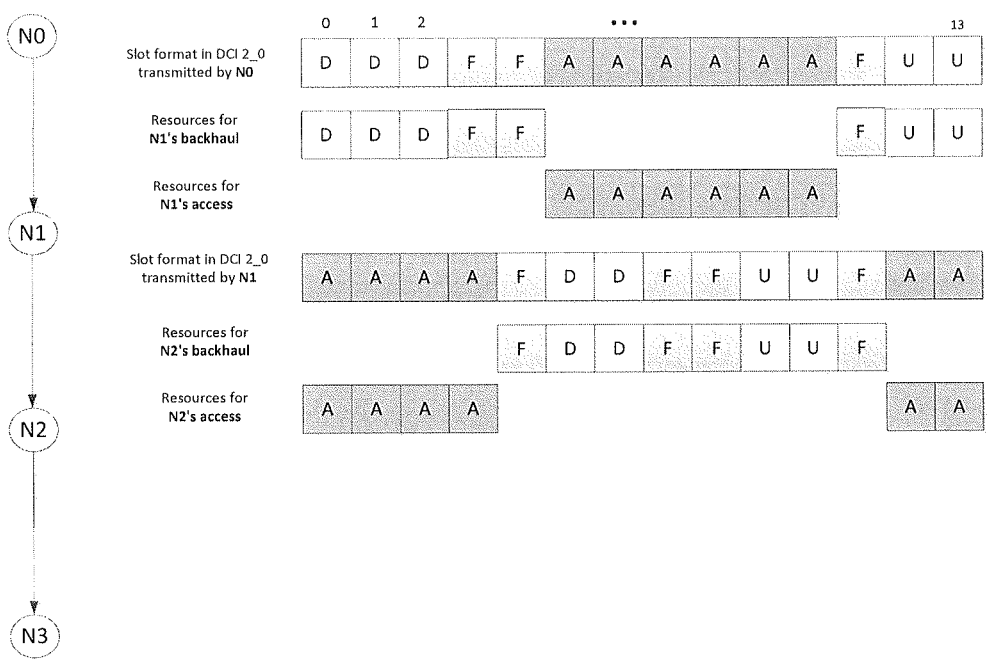
FIG. 3 is a schematic diagram illustrating resource partitioning between backhaul and access links in the first embodiment.

FIG. 3 is a schematic diagram illustrating resource partitioning between backhaul and access links of the first embodiment.

As depicted in FIG. 3, N0-N3 represent four nodes in the multi-hop IAB system. The arrows in the FIG. 3 indicate the transmission direction of the slot format information, that is, node N0 transmits slot format indication in DCI format 2_0 to node N1 to indicate the slot format for the symbols in a slot. The slot format indication contains state information assigned to symbols in a slot for the link from N0 to N1. For example, as shown in FIG. 3, symbols 0-4 and symbols 11-13 are assigned to one of the following states-"D", "U", and "F", and represent resources for N1's backhaul link, whereas, symbols 5-10, are assigned to have state "A" to represent resources for N1's access. Then, node N1 transmits slot format indication to node N2 based on the received slot format information from N0 assigning symbols 0-3 and symbols 12-13 to have state "A" represent resources for N2' access, and symbols 4-10, wherein symbols 4-10 indicated as having one of "D". "U", and "F" states and representing resources assigned for N2's backhaul link. Similarly, node N2 transmits slot format indication to node N3 based on the received slot format information from node N2. From FIG. 3, symbols 0-13 constitute one slot, upper node (e.g. node N1) will assign the symbols 0-13 for DL, flexible, UL transmission for backhaul link or for the access link of lower node (e.g. node N2).

In FIG. 3, a new state "A" in slot format information has been introduced for indicating a symbol used as a resource for an access link. In the first embodiment, 2 bits are used to differentiate between state D", "U", "F" and "A", where states "D", "U" and "F" are used for the receiver's DL, UL, and flexible resources for backhaul link, respectively, and "A" means resources are assigned for the receiver's access link. Regarding how to allocate all of the symbols assigned to have state "A" among states: "D", "U" and "F" for the receiver's access link, it will be further decided by the receiver node itself. For example, in FIG. 3, symbols 0/1/2, 3/4/11, 12/13 have been indicated by node N0 to node N1 as its backhaul link's DL, flexible and UL resources, respectively, and symbols 5-10 for node N1's access link. Finally when node N1 transmits slot format information to node N2 in DCI 2_0, node N1 chooses symbol 5 and 6 as its DL resources for access link, and symbol 9 and 10 as its UL resources for access link. For symbols 0/1/2, 3/4/11 and 12/13, N1 cannot assign them as either DL or UL resources for access link. N1 can indicate them as "A" to be further used by lower nodes (e.g. N2's access link) or as "F" to be used as gap for N1's access link. In the example of FIG. 3, symbols 0/1/2/3 and 12/13 are identified as resources for receiver's access link (N2's access link) and symbol 4 and symbol 11 are used as gaps for N1's access link.

Figure 4:
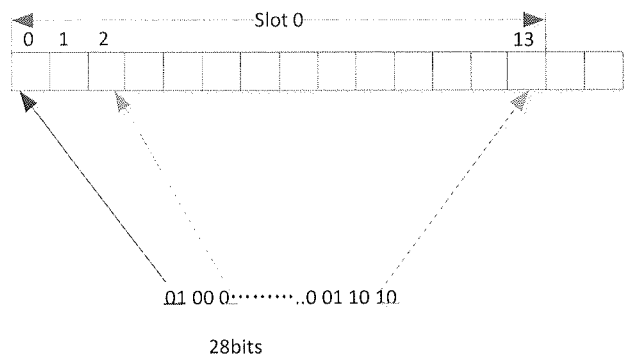
FIG. 4 is a schematic diagram illustrating one example of per symbol indication.

FIG. 4 is a schematic diagram illustrating one example of per symbol indication. As depicted in FIG. 4, if the indication is performed per symbol, then each slot format is indicated by 28 bits. The 28 bits are divided into 14 groups, with each group having 2 bits assigned for each symbol in sequence. The slot format can still be transmitted in DCI 2_0.

Figure 5:
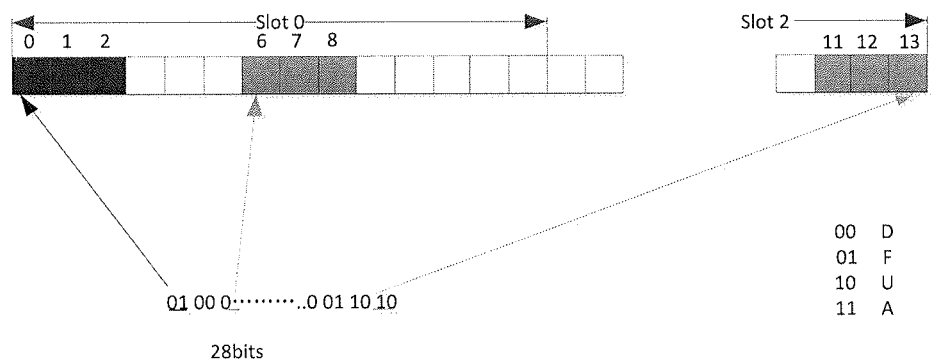
FIG. 5 is a schematic diagram illustrating one example of per symbol group indication.

FIG. 5 is a schematic diagram illustrating one example of per symbol group indication. As depicted in FIG. 5, one of the 4 states "D", "F", "U" and "A" can also be associated with a groups of symbols. Here we define a concept "slot format information" to contain formats on each symbol of one or multiple slots. The formats can be one of states "D", "F", "U", "A". Suppose a group size is N symbols and each slot includes 14 symbols, and the symbol groups do not cross the slot boundary, the slot format information for a slot is indicated by ceil(14/N*2) bits. That is, when the group size N is 2 or 7, the slot format for a slot is indicated by 14 bits or 4 bits. The slot format can still be transmitted in DCI 2_0. When the system groups cross the slot boundary, we can indicate the slot format information for multiple slots together. For example, when N=3, we can ultilize 28 bits to indicate the slot format information for 3 slots. There are 42 symbols in 3 slots. They can be divided into different symbol groups. Each group has 3 symbols. As shown in FIG. 5, red symbols (symbols 0-2 of slot 0) are the first symbol group, green symbols (symbols 6-8 of slot 0) are the third symbol group, and blue symbols (symbols 11-13 of slot 2) are the last symbol group. Each group consumes 2 bits to differentiate states "D", "F", "U" and "A" for these 3 symbols. The indication in FIG. 5 is as following: bits 0-1 indicate slot format for symbols 0-2 of slot 0, bits 2-3 indicate slot format for symbols 3-5 of slot 0, bits 4-5 indicate slot format for symbols 6-8 of slot 0, and eventually, bits 26-27 indicate slot format for symbols 11-13 of slot 2.

The symbol group can either cross or not cross the slot boundary based on group size configuration. In this case, the meaning of RRC parameter "slotFormats SEQUENCE (SIZE (1 . . . maxNrofSlotFormatsPerCombination)) OF INTEGER (0.255)" in NR R15 specification should be reinterpreted. It should be "slotFormats SEQUENCE (SIZE (1 . . . maxValue)) OF INTEGER(0 . . . 3)", with each 2 bits used to indicate format for a group of symbols. In NR R15 specification, the slot format information carried in "slotFormats" has a unit of 8 bits due to the range from 0 to 255. While for the reinterpreted slot format information, it has a unit of 2 bits due to the range is from 0 to 3. For example, if the group size is 4, and the payload size of slotFormats is 28, as there are 2 bits for each group, then there are in total 28/2=14 groups. With the group size equals 4, there are in total 14*4=56 symbols. As a slot contains 14 symbols, so the 56 symbols construct 4 slots. So it can be concluded that the 28 bits are used to indicate slot format information for symbols transmitted/received across 4 slots, e.g. 28 bit can be used to represent slots 0-3.

In one embodiment, the group size can be determined by the RNTI. In NR R15 specification, the payload of DCI 2_0 is encoded by CRC. The RNTI value is used to determine the CRC sequence. Different RNTI values are used to indicate different groups sizes, such as 2, 4, or 7. Any group size is possible, however, the mini-slot length is restricted to be 2, 4 and 7 symbols in NR R15, and mini-slot is also a group of symbols, so here we take group size of 2, 4, or 7 symbols as examples. For example, RNTI value 1111 is used to indicate group size 2, RNTI value 1112 is used to indicate group size 4, and RNTI value 1113 is used to indicate group size 7.

In another embodiment, the group size can also be determined by the RRC parameter positionInDCI (RRC parameter indicating the payload position in a DCI 2_0 for a UE for a cell). In NR R15 specification, a DCI 2_0 may carry slot format information for many UEs and many cells. So a UE needs to know which part of DCI 2_0 carries information pertinent to itself. And if a UE is configured with multiple cells, it also needs to know which part of DCI 2_0 is for a specific cell. The RRC parameter positionInDCI is used to indicate to a UE the payload starting position for a specific cell of the UE. For example, if UE1 is configured with cell 0, 1 and 2, and the positionInDCI for these three cells indicates payload position of 0, 10 and 20 bits, respectively, the UE can conclude that bits 0-7, 10-17, and 20-27 indicate slot format for cell 0, 1, and 2, respectively, with the predetermined slot format length equals 8 bits. For example, 8 bits is determined by the symbol group size equals 7 and number of slots indicated in a single DCI is 2. In our proposed scheme, some of the DCI 2_0 payloads (with different starting positions) are reserved for different group sizes, such as 2, 4, and 7 symbols, and others can be used as in the legacy release. For example, when a UE is configured with positionInDCI parameter indicating payload position of 11 for cell 0, the UE can conclude that the symbol group size for cell 0 is 2 symbols. When a UE is configured with positionInDCI parameter indicating payload position of 21 for cell 1, it can conclude that the symbol group size for cell 1 is 4 symbols. When a UE is configured with positionInDCI parameter indicating payload position of 31 for cell 2, it can conclude that the symbol group size for cell 2 is 7 symbols. The relationship between the RRC parameter positionInDCI and the group size can be RRC configured or predetermined in specification.

In another embodiment, the group size can also be determined by the DCI monitoring/detection symbol. The symbol can be the DCI monitoring symbol configured by RRC signaling. The symbol can also be the symbol when the DCI is detected. Different symbols can be used to indicate different group sizes, such as 2, 4 or 7 symbols. For example, DCI monitoring symbol 1 indicates group size 2, DCI monitoring symbol 2 indicates group size 4, and DCI monitoring symbol 3 indicates group size 7. The relationship between the DCI monitoring/detection symbol and the group size can also be RRC configured or predetermined in specification.

Table 1 shows existing slot formats in NR R15.

TABLE 1

| Format | \multicolumn{14}{c}{Symbol number in a slot} |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | F | F | F | F | F | F | F | F | F | F | F | F | F | F |
| 3 | D | D | D | D | D | D | D | D | D | D | D | D | D | F |
| 4 | D | D | D | D | D | D | D | D | D | D | D | D | F | F |
| 5 | D | D | D | D | D | D | D | D | D | D | D | F | F | F |
| 6 | D | D | D | D | D | D | D | D | D | D | F | F | F | F |
| 7 | D | D | D | D | D | D | D | D | D | F | F | F | F | F |
| 8 | F | F | F | F | F | F | F | F | F | F | F | F | F | U |
| 9 | F | F | F | F | F | F | F | F | F | F | F | F | U | U |
| 10 | F | U | U | U | U | U | U | U | U | U | U | U | U | U |
| 11 | F | F | U | U | U | U | U | U | U | U | U | U | U | U |
| 12 | F | F | F | U | U | U | U | U | U | U | U | U | U | U |
| 13 | F | F | F | F | U | U | U | U | U | U | U | U | U | U |
| 14 | F | F | F | F | F | U | U | U | U | U | U | U | U | U |
| 15 | F | F | F | F | F | F | U | U | U | U | U | U | U | U |
| 16 | D | F | F | F | F | F | F | F | F | F | F | F | F | F |
| 17 | D | D | F | F | F | F | F | F | F | F | F | F | F | F |
| 18 | D | D | D | F | F | F | F | F | F | F | F | F | F | F |
| 19 | D | D | F | F | F | F | F | F | F | F | F | F | F | U |
| 20 | D | D | F | F | F | F | F | F | F | F | F | F | F | U |
| 21 | D | D | D | F | F | F | F | F | F | F | F | F | F | U |
| 22 | D | F | F | F | F | F | F | F | F | F | F | F | U | U |
| 23 | D | D | F | F | F | F | F | F | F | F | F | F | U | U |
| 24 | D | D | D | F | F | F | F | F | F | F | F | F | U | U |
| 25 | D | F | F | F | F | F | F | F | F | F | F | U | U | U |
| 26 | D | D | F | F | F | F | F | F | F | F | F | U | U | U |
| 27 | D | D | D | F | F | F | F | F | F | F | F | U | U | U |
| 28 | D | D | D | D | D | D | D | D | D | D | D | D | F | U |
| 29 | D | D | D | D | D | D | D | D | D | D | D | F | F | U |
| 30 | D | D | D | D | D | D | D | D | D | D | F | F | F | U |
| 31 | D | D | D | D | D | D | D | D | D | D | D | F | U | U |
| 32 | D | D | D | D | D | D | D | D | D | D | F | F | U | U |
| 33 | D | D | D | D | D | D | D | D | F | F | F | F | U | U |
| 34 | D | F | U | U | U | U | U | U | U | U | U | U | U | U |
| 35 | D | D | F | U | U | U | U | U | U | U | U | U | U | U |
| 36 | D | D | D | F | U | U | U | U | U | U | U | U | U | U |
| 37 | D | F | F | U | U | U | U | U | U | U | U | U | U | U |
| 38 | D | D | F | F | U | U | U | U | U | U | U | U | U | U |
| 39 | D | D | D | F | F | U | U | U | U | U | U | U | U | U |
| 40 | D | F | F | F | U | U | U | U | U | U | U | U | U | U |
| 41 | D | D | F | F | F | U | U | U | U | U | U | U | U | U |
| 42 | D | D | D | F | F | F | U | U | U | U | U | U | U | U |
| 43 | D | D | D | D | D | D | D | D | D | F | F | F | F | U |
| 44 | D | D | D | D | D | D | F | F | F | F | F | F | U | U |
| 45 | D | D | D | D | D | D | F | U | U | U | U | U | U | U |
| 46 | D | D | D | D | D | F | U | D | D | D | D | D | F | U |
| 47 | D | D | F | U | U | U | U | D | D | F | U | U | U | U |
| 48 | D | F | U | U | U | U | U | D | F | U | U | U | U | U |
| 49 | D | D | D | D | F | F | U | D | D | D | D | F | F | U |
| 50 | D | D | F | F | U | U | U | D | F | F | U | U | U | U |
| 51 | D | F | F | U | U | U | U | D | F | F | U | U | U | U |

TABLE 1-continued

| Format | Symbol number in a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 52 | D | F | F | F | F | F | U | D | F | F | F | F | F | U |
| 53 | D | D | F | F | F | F | U | D | D | F | F | F | F | U |
| 54 | F | F | F | F | F | F | F | D | D | D | D | D | D | D |
| 55 | D | D | F | F | F | U | U | U | D | D | D | D | D | D |
| 56-254 | Reserved | | | | | | | | | | | | | |
| 255 | UE determines the slot format for the slot based on tdd-UL-DL-ConfigurationCommon, tdd-UL-DL-ConfigurationCommon2, or tdd-UL-DL-ConfigDedicated and, if any, on detected DCI formats | | | | | | | | | | | | | |

In another embodiment, the available group size can be restricted by the supported mini-slot length meaning only 2, 4 or 7 symbols are supported. To support group size of 7 symbols, 16 reserved codepoints/rows in Table 1 can be used if there are 4 possible formats for each group. Each group has 4 states, and there are two groups in a slot, so there are 16 states in total. If there are only 3 possible formats for each group, 9 reserved codepoints/rows can be used from Table 1. In this case, each group has 3 states, and there are two groups in a slot, so there are 9 states in total. When the group size is set to 4 symbols, we propose to use 2+4+4+4 to construct a slot. In this case, there are 4 symbols groups in a slot. The first group has 2 symbols, and the remaining three groups has 4 symbols for each group. In this case, we can use 3 possible formats with a total of 81 states. In this case, each group has 3 states, and there are 4 groups, so there are 81 states in total. We can also use 4 possible formats to indicate the last 3 groups in a slot (the first 2 symbols can be preconfigured by RRC or predefined in specification), then 64 states are necessary. In this case, each of the second, third and fourth group has 4 states, and there are 3 groups to be indicated in total, so there are 64 states. Both 81 states and 64 states can be covered by the existing table. For group size 2, it cannot be covered by Table 1 as the necessary states are too large. In this case, there will be 7 groups in a slot, if each group has 4 states, the total states will be too large, And there is at most 200 reserved states in the table, so it can NOT be covered.

Regarding backward compatibility for legacy R15 UEs, they can be configured with a separate RNTI value or with a different positionInDCI, and they can also be restricted to be configured with different symbols that then used for group size indication. The legacy UE can also be configured with no DCI 2_0 monitoring behavior, and dynamic scheduling DCI can be used to indicate the symbol formats.

Figure 6:
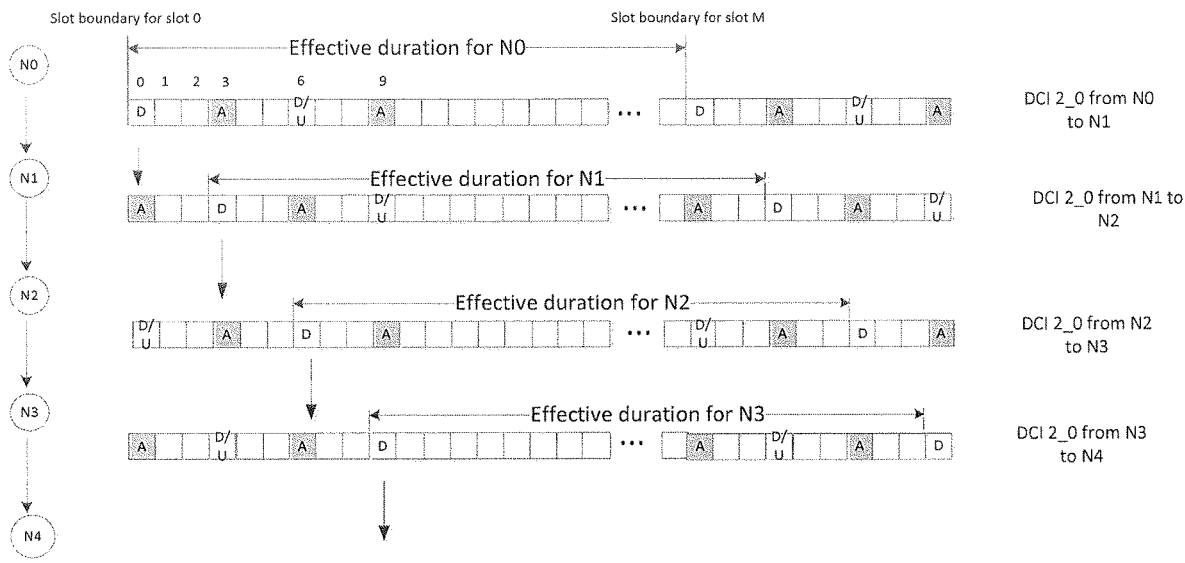
FIG. 6 is a schematic diagram illustrating one example of the second embodiment.

FIG. 6 is a schematic diagram illustrating one example of the second embodiment. As illustrated in FIG. 6, the starting and ending position of the DCI 2_0 effective duration in the multi-hop system is proposed.

Similar to FIG. 3, in FIG. 6, N0-N4 represent five nodes in the multi-hop IAB system. The arrows in the FIG. 6 indicate the transmission direction of the slot format information, that is, node N0 transmits slot format indication in DCI format 2_0 to node N1 to indicate the slot format for the symbols in one or multiple slots. Then, node N1 transmits slot format indication to node N2 based on the received slot format information from node N0. Node N1 needs to know the available symbols for its access link (link N1 to N2) at first before it can determine how to allocate the available symbols between DL, UL and flexible states. As a result, the DCI 2_0 transmission from N1 to N2 should be after the DCI 2_0 transmission from node N0 to N1. In FIG. 6, we suppose the delay between DCI 2_0 reception by N1 and DCI 2_0 transmission to node N2 is 3 symbols. As a result, node N0 transmits DCI 2_0 in symbol 0 of slot 0 and node N1 transmits DCI 2_0 in symbol 3 of slot 0. Similarly, node N2 also transmits slot format indication to node N3 based on the received slot format information received from node N1 in symbol 6 of slot 0 with a time delay of 3 symbols. Finally, node N3 transmits slot format indication in DCI 2_0 to node N4 based on the received slot format information from node N2 in symbol 9 of slot 0 with a time delay of 3 symbols as well.

As shown in FIG. 6, arrows are used to indicate DCI 2_0 transmission from parent node to child node. For example, symbol 0, 3, 6 and 9 of slot 0 are allocated to nodes N0, N1, N2 and N3 for DCI 2_0 transmission respectively. The symbols for DCI 2_0 transmission can be configured by RRC signaling, which is the same as in NR R15 specification. Meanwhile, symbol 0, 3, 6 and 9 of slot 0 is also used by nodes N1, N2, N3 and N4 for DCI 2_0 reception, respectively. As a result, symbol 0 of slot 0 is indicated by N0 to N1 as DL for DCI 2_0 reception of N1, and due to half duplex constraint, N1 cannot transmit information in symbol 0 of slot 0, so the symbol 0 of slot 0 should be indicated as "A" in the DCI 2_0 transmitted by node N1 to node N2. Regarding the node N2, as there is no reception operation in symbol 0 of slot 0, it can utilize symbol 0 of slot 0 as DL or UL resources, and whether it is DL or UL can be indicated by the DCI 2_0 transmitted by node N2 to node N3. When it comes to node N3, as node N3 needs to receive or transmit information in symbol 0 of slot 0 per the scheduling from node N2, it cannot use symbol 0 of slot 0 as resources for its access link, thus the DCI 2_0 transmitted by node N3 to node N4 should indicate symbol 0 of slot 0 as "A". Similar restrictions also apply to symbol 3, 6 and 9 of slot 0. As a result, symbol 3 of slot 0 is indicated as "A" in DCI 2_0 transmitted by node N0 to node N1. Symbol 3 of slot 0 is subsequently indicated as "D" in a DCI 2_0 transmitted by node N1 to node N2. Symbol 3 of slot 0 is then indicated as "A" in DCI 2_0 payload transmitted by node N2 to node N1. Finally, symbol 3 of slot 0 is indicated as "D" or "U" in a DCI 2_0 transmitted by node N3 to node N4. Similar restrictions and corresponding symbol format of symbol 6 and 9 of slot 0 is also shown in FIG. 6.

As a result, the symbol format of symbol 0, 3, 6 and 9 of slot 0 should be semi-statically configured to guarantee that there is enough resource for DCI 2_0 transmissions. While other resources can be dynamically configured by the transmitted DCI 2_0.

DCI 2_0 transmission happens periodically based on NR R15 specification. When a DCI 2_0 is received, it can indicate slot formats for multiple slots. Suppose DCI 2_0 is received in symbol 2 of slot 0, and the number of slots indicated by DCI 2_0 is 10, then the DCI 2_0 indicates slot formats from symbol 0 of slot 0 to symbol 13 of slot 9. The symbol format indication for symbols 0 and 1 of slot 0 is useless, as they are gone when the DCI 2_0 carrying format indication is received by the child node. However, in NR R15, this can be avoided by configuring DCI 2_0 transmission in symbol 0. While in a multi-hop IAB system, as the child node's DCI 2_0 transmission takes place after the DCI 2_0 transmission of the parent node, the child node's DCI 2_0 transmission needs to be configured to be at any possible symbols other than symbol 0, which is also shown in FIG. 6.

When the DCI 2_0 is not transmitted in symbol 0 of a slot, we propose to apply the format information in DCI 2_0 from the symbol when DCI 2_0 payload is received by the child's node. Here we define a concept "effective duration", which is a time duration of the format information in DCI 2_0 as applied. It has a starting symbol and an ending symbol. For example, in FIG. 6, the effective duration of node N0 is from symbol 0 of slot 0 to symbol 13 of slot (M−1). Where symbol 0 of slot 0 is the time when DCI 2_0 is transmitted by node N0, and M is the number of slots whose format information are indicated in a single DCI 2_0. As a result, there will be a new DCI 2_0 indicating slot format information for slots starting with symbol 0 of slot M. When it comes to node N1, its DCI 2_0 is transmitted in symbol 3 of slot 0, so the effective duration of node N1 starts from symbol 3 of slot 0, and ends at symbol 2 of slot M. Similar effective duration can also be calculated for node N2 and N3. In other words, the starting position of an effective duration is the symbol when the slot format indication (DCI 2_0) is monitored/detected. And the ending position is the symbol just before the symbol when DCI 2_0 is monitored/detected.

It can be concluded that the definition of an effective duration for a multi-hop IAB network is different from that in NR R15 specification. Base on the NR R15 specification, the slot format indication in DCI 2_0 applies from the slot boundary regardless of on which symbol DCI 2_0 payload is monitored/detected on (the symbol for DCI 2_0 monitoring can be configured by RRC signaling already). While in the embodiment, the DCI 2_0 applies from the symbol when it is monitored/detected. While there are legacy UEs in the network, so there will be some backward compatibility issues. There are two options to solve this problem:

The first option is achieved by explicit signaling. For example, 1 bit RRC signaling can be used to indicate the slot format information to be applied at the start of a slot boundary or the starting symbol for DCI 2_0 reception. For example, when the 1 bit RRC signaling is 0, then the slot format applies from symbol 0 of the slot in which the DCI 2_0 carrying slot format is detected. And when the 1 bit RRC signaling is 1, then, the slot format information is applied from the symbol when DCI 2_0 carrying slot format information is detected.

The second option is achieved by implicit signaling. In this case, the symbol index configured by RRC signaling for DCI 2_0 monitoring can be used to indicate the starting position of the applied slot format. For example, when the monitoring symbol configured for DCI 2_0 carrying slot format information is indicated as symbol 2, then symbol 2 becomes a starting position to apply the slot format if DCI 2_0 is detected. When the monitoring symbol configured for DCI 2_0 carrying slot format is symbol 5, then symbol 5 in the same slot is the starting position to apply the slot format if DCI 2_0 is detected. When the monitoring symbol configured for DCI 2_0 carrying slot format is symbol 0, then symbol 0 of the same slot is the starting position to apply the slot format if DCI 2_0 is detected. In this case, only when the DCI 2_0 monitoring symbol is configured as symbol 0, it is same as in legacy NR R15 specification. Since symbol 0 used as the starting position is the same as used in legacy releases, monitoring symbol configured as 0 can be used for legacy UE for backward compatibility. As a result, for legacy UE, DCI 2_0 is always configured to be monitored from a slot boundary; while for new UE, every symbol can be configured as the starting position for DCI 2_0 monitoring.

Figure 7:
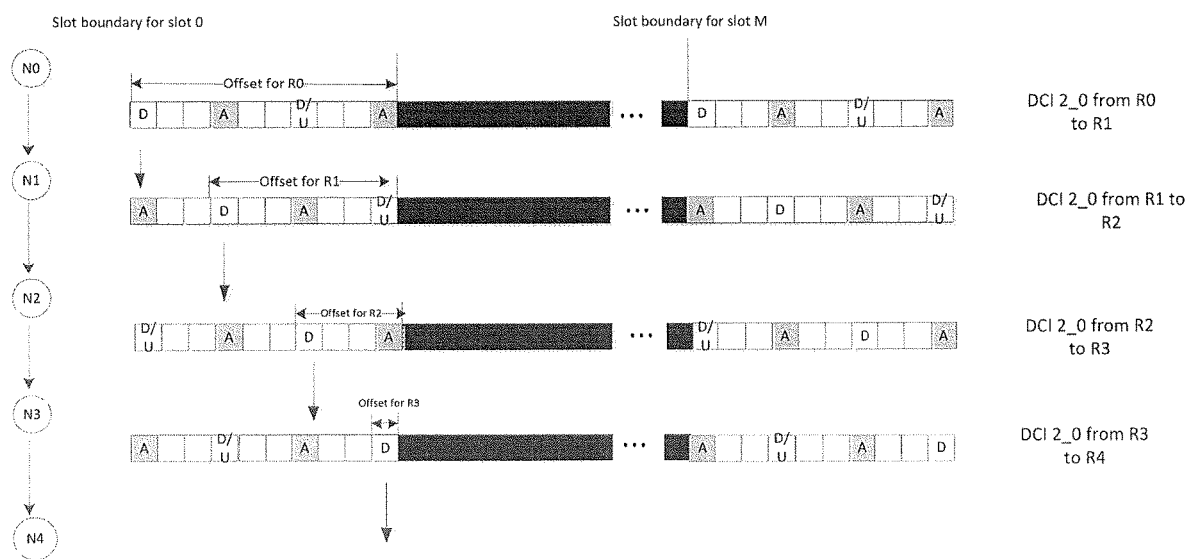
FIG. 7 is a schematic diagram illustrating one example of the third embodiment.

FIG. 7 is a schematic diagram illustrating one example for the third embodiment. As illustrated in FIG. 7, determination of the starting position and ending position of the flexible symbols is proposed.

Similar to FIG. 6, in FIG. 7, N0-N4 represent four nodes in the multi-hop IAB system. The arrows in FIG. 7 indicate transmission direction of the slot format information, that is, node N0 transmits slot format indication in DCI format 2_0 to node N1 to indicate the slot format information for the symbols in one or multiple slots. Then, node N1 transmits slot format indication to node N2 based on the received slot format information received from N0. Since node N1 needs to know the available symbols for its access link (link N1 to N2) at first, it can then determine how to divide the available symbols between DL, UL and flexible symbol states. Hence, the DCI 2_0 transmission from node N1 to node N2 should be after the DCI 2_0 transmission from node N0 to node N1. In FIG. 6, we chose 3 symbols, as an example only, as the delay between DCI 2_0 payload reception by node N1 and DCI 2_0 payload transmission by node N1 to node N2. as. As a result, node N0 transmits DCI 2_0 in symbol 0 of slot 0, and node N1 transmits DCI 2_0 in symbol 3 of slot 0. Similarly, node N2 also transmits slot format indication to node N3 based on the received slot format information from node N1 in symbol 6 of slot 0 with a time delay of 3 symbols. Finally, node N3 transmits slot format indication to node N4 based on the received slot format information from node N2 in symbol 9 of slot 0 with a time delay of 3 symbols.

As we already explained, there are some restrictions on symbol 0. 3, 6 and 9 of slot 0, so the format information for them can be semi-statically configured. As the DCI 2_0 is used to indicate the dynamic time domain resources, DCI 2_0 can be used to only indicate the format for symbols other than symbol 0, 3, 6 and 9 of slot 0. In this case, the number of slots/symbols whose formats are indicated in a single DCI can be reduced, and the DCI 2_0 overhead can be reduced as well.

Figure 8:
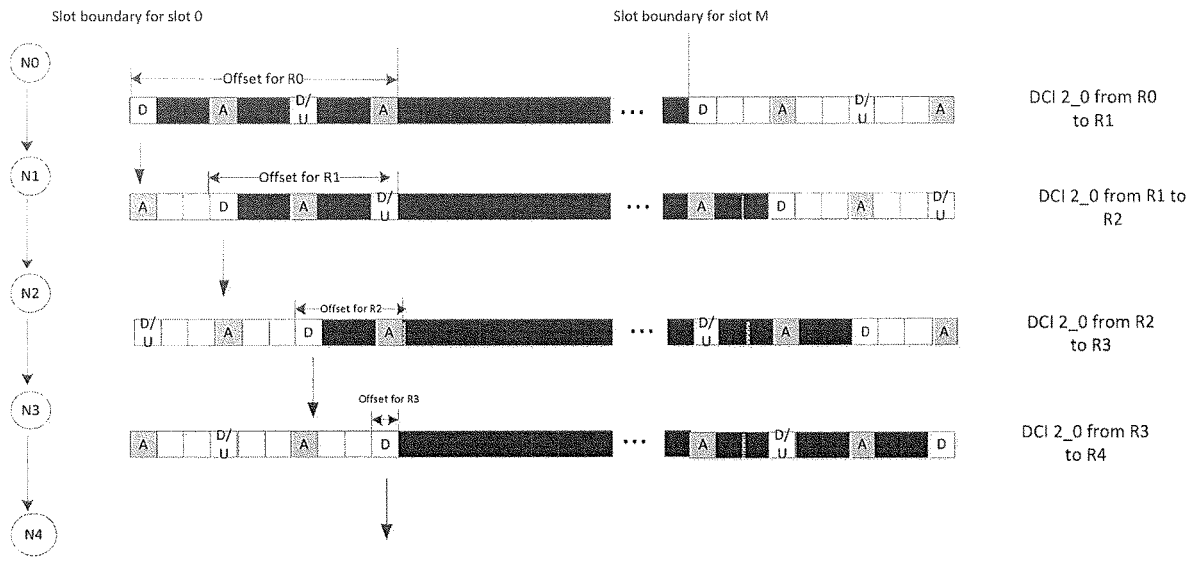
FIG. 8 is a schematic diagram illustrating another example of the third embodiment.

There are also two alternatives regarding which symbols are semi-statically configured and which symbols are dynamically indicated by DCI 2_0. Alternative 1 is that symbol 0 to symbol 9 of slot 0 are excluded from the dynamic indication by DCI 2_0, which is shown in FIG. 7. Alternative 2 is that only symbol 0, 3, 6 and 9 are excluded from the dynamic indication by DCI 2_0, which is shown in FIG. 8. With Alternative 1, the symbols indicated by a DCI 2_0 contain only continuous symbols, and it has no additional work on how to determine the discontinuous symbols. With Alternative 2, there are as many as possible symbols indicated dynamically, and the resource utilization efficiency can be improved. In the following, we provide more details regarding the two alternatives.

In the third embodiment related to Alternative 1 as shown in FIG. 7, as symbols 0, 3, 6 and 9 of slot 0 and symbols within them (that is symbol 1, 2, 4, 5, 7 and 8) are precluded from the dynamic indication by DCI 2_0, the effective duration of all the IAB nodes with different hop orders are the same (e.g. the red symbols in FIG. 7), that is from symbol 10 of slot 0 to symbol 13 of slot M−1 with the assumption that DCI 2_0 transmission periodicity is M slots or the number of indicated symbols in a single DCI 2_0 is (14*M−9). There are two ways to indicate the effective duration for Alternative 1.

One way is introduce a RRC parameter to indicate the starting position of the effective duration. In the example shown in FIG. 7, this RRC parameter will indicate symbol 10 of slot 0. In this way, no matter a UE or an IAB node is connected to which IAB node (N0 or N1 or other IAB node), the starting symbol of the effective duration is always symbol 10 of slot 0.

The other way is to indicate the offset relative to the DCI 2_0 reception symbol. As shown in FIG. 7, DCI 2_0 from node N0 is received in symbol 0 of slot 0, and the starting symbol of effective duration is symbol 10, then the offset value should be 10 symbols. Similarly, when the DCI 2_0 transmitted from N1 is in symbol 3 of slot 0, and the starting symbol of the effective duration is also symbol 10 of slot 0, then the offset value for node N1 should be 7 symbols. Similarly, the offset value for DCI 2_0 transmitted by node N2 is 4 symbols, and the offset value for DCI 2_0 transmitted by N3 is 1 symbols. In this case, the connected UE or IAB node can be RRC configured with the offset value to determine the time difference between the DCI 2_0 reception and the starting of the effective duration.

Alternatively, the connected UE or IAB node can also be RRC configured with the hop order of the associated node and the maximum order in the IAB network. The node can be a donor node or an IAB node. With the hop order information, the UE or IAB node can calculate the offset value based on the indicated hop order. For example, in FIG. 7, node N0 has a hop order 0, node N1 has a hop order of 1, node N2 has a hop order of 2, and node N3 has a hop order of 3. The maximum order of the multi-hop IAB network is 4. When UE is connected node N1 receives DCI 2_0 in symbol 3, with the RRC configured connected node hop order 1, and the maximum order of the network set as 4, it can concluded that there will be two semi-static symbols—symbol 6 and symbol 9 for the remaining IAB nodes whose hop order value is larger than its order, then the starting position of the effective duration of the dynamic indicated symbols by DCI 2_0 is symbol 10 of slot 0, then the offset value of 7 symbols can be calculated. Similar operations can also be adopted to other UEs connected to IAB nodes of different hop orders.

The embodiment related to Alternative 2 is shown in FIG. 8. In this option, DCI 2_0 is used to indicate both the continuous symbols and the discontinuous symbols within the semi-static symbols (all the red symbols in FIG. 8). For example, the indicated symbols of DCI 2_0 transmitted by node N1 are from symbol 3 of slot 0 to symbol 2 of slot M precluding symbols 3, 6 and 9 of slot 0 and symbol 0 of slot M. The indicated symbols of DCI 2_0 transmitted by node N2 is from symbol 6 of slot 0 to symbol 5 of slot M precluding symbols 0 and 6 of slot 0 and symbols 0 and 3 of slot M.

Compared with the Alternative 1 shown in FIG. 7, Alternative 2 shown in FIG. 8 needs additional information on the discontinuous symbols. This can be indicated by the number of symbols between DCI 2_0 transmissions of two IAB nodes with adjacent hop orders, which can be RRC configured. For example, as shown in FIG. 8, nodes N1 and N2 are IAB nodes having adjacent hop orders (N1 has hop order 1, and N2 has hop order 2). DCI 2_0 transmitted from node N1 happens at symbol 3, and DCI 2_0 transmitted from node N2 happens at symbol 6, so the number of symbols between DCI 2_0 transmission of nodes N1 and N2 is 3. Here we define the number of symbols between DCI 2_0 transmission of two IAB nodes with adjacent hop orders as difference symbol number. If we assume the same number of symbols between DCI 2_0 of all the IAB nodes with adjacent hop orders, then the number of symbols between DCI 2_0 payload from node N0 and DCI 2_0 from node N1 is also 3 symbols, and the number of symbols between DCI 2_0 transmitted from node N2 to DCI 2_0 transmitted from node N3 is also 3 symbols. In this case, with the offset value as in Alternative 1 shown in FIG. 7 and the difference symbol number, the discontinuous dynamic symbols can be determined. For example, for a UE connected to IAB node N1, the offset will be indicated as 7 symbols, and the difference symbol number will be indicated as 3, when DCI 2_0 is received in symbol 3, then the discontinuous symbols can be determined as symbol 4 5 and 7, 8 of slot 0 and symbol 0 and 1 of slot M, where M is the DCI 2_0 transmission periodicity or the number of slots indicated by a single DCI 2_0.

As a result, from a signaling perspective, two RRC parameters need to be configured: the offset between DCI 2_0 receptions and the starting of continuous dynamic symbols, and the number of symbols between DCI 2_0 receptions of two IAB nodes with adjacent orders.

Figure 9:
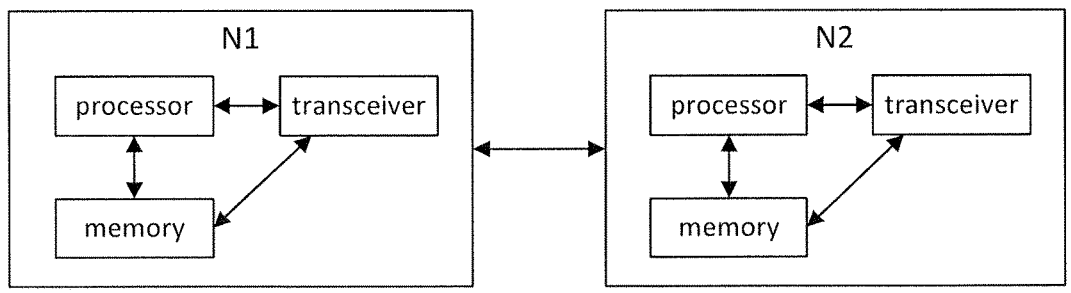
FIG. 9 is a schematic block diagram illustrating a node for indicating slot format information.

FIG. 9 is a schematic block diagram illustrating a node indicating slot format information.

Referring to FIG. 9, The node includes a processor, a memory, and a transceiver. The processor implements a function, a process, and/or a method which are proposed in FIGS. 2 to 8 above. Layers of a radio interface protocol may be implemented by the processor. The memory is connected with the processor to store various pieces of information for driving the processor. The transceiver is connected with the processor to transmit and/or receive a radio signal.

The memories may be positioned inside or outside the processors and connected with the processors by various well-known means. Further, the relay node may have a single antenna or multiple antennas.

In the embodiments described above, the components and the features of the embodiments are combined in a predetermined form. Each component or feature should be considered as an option unless otherwise expressly stated. Each component or feature may be implemented not to be associated with other components or features. Further, the embodiment may be configured by associating some components and/or features. The order of the operations described in the embodiments may be changed. Some components or features of any embodiment may be included in another embodiment or replaced with the component and the feature corresponding to another embodiment. It is apparent that the claims that are not expressly cited in the claims are combined to form an embodiment or be included in a new claim.

The embodiments may be implemented by hardware, firmware, software, or combinations thereof. In the case of implementation by hardware, according to hardware implementation, the exemplary embodiment described herein may be implemented by using one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and the like.

In the case of implementation by firmware or software, the embodiment may be implemented in the form of a module, a procedure, a function, and the like to perform the functions or operations described above. A software code may be stored in the memory and executed by the processor. The memory may be positioned inside or outside the processor and may transmit and receive data to/from the processor by various means.

The invention claimed is:

1. A method of an integrated access and backhaul (IAB) node for indicating slot format information, the method comprising:
   receiving the slot format information indicating time domain resources of a slot format used for:
      downlink reception on a first link between the IAB node and a parent node of the IAB node;
      uplink transmission on the first link between the IAB node and the parent node;
      flexible communication on the first link between the IAB node and the parent node; and
      downlink or uplink communication on a second link between the IAB node and a child node of the IAB node or a third link between the IAB node and a serving user equipment (UE) of the IAB node;
   determining whether the downlink or uplink communication of the indicated time domain resources are for the second link between the IAB node and the child node, or the third link between the IAB node and the UE; and
   determining whether each time domain resource of the indicated time domain resources is for downlink communication, or uplink communication.

2. The method of claim 1, wherein the slot format information comprises at least one format for one or more symbols of one or more slots.

3. The method of claim 2, wherein a symbol group size is indicated by a radio network temporary identifier of downlink control information.

4. The method of claim 2, wherein a symbol group size is indicated by a starting position of a payload of a cell in downlink control information.

5. The method of claim 2, wherein a symbol group size is indicated by a symbol when downlink control information is detected.

6. The method of claim 2, further comprising reserving rows in a table used for each group size, and different rows in the table are associated with different group sizes.

7. A integrated access and backhaul (IAB) node for indicating slot format information, the IAB node comprising:
   at least one memory; and
   at least one processor coupled with the at least one memory and configured to cause the IAB node to:
      receive the slot format information indicating time domain resources of a slot format used for:
         downlink reception on a first link between the IAB node and a parent node of the IAB node;
         uplink transmission on the first link between the IAB node and the parent node;
         flexible communication on the first link between the IAB node and the parent node; and
         downlink or uplink communication on a second link between the IAB node and a child node of the IAB node or a third link between the IAB node and a user equipment (UE) of the IAB node;
      determine whether the downlink or uplink communication of the indicated time domain resources are for the second link between the IAB node and the child node, or the third link between the IAB node and the UE; and
      determine whether each time domain resource of the indicated time domain resources is for downlink communication, or uplink communication.

8. The IAB node of claim 7, wherein the slot format information comprises at least one format for one or more symbols of one or more slots.

9. The IAB node of claim 8, wherein a symbol group size is indicated by a radio network temporary identifier of downlink control information.

10. The IAB node of claim 8, wherein a symbol group size is indicated by a starting position of a payload of a cell in downlink control information.

* * * * *